March 15, 1966   F. G. WEIS   3,240,228
NONCLOGGING CHECK VALVE
Original Filed April 11, 1960

INVENTOR.
Frank G. Weis
BY

ATTORNEYS.

United States Patent Office 3,240,228
Patented Mar. 15, 1966

3,240,228
NONCLOGGING CHECK VALVE
Frank G. Weis, Kansas City, Mo., assignor to Union Tank Car Company, a corporation of New Jersey
Original application Apr. 11, 1960, Ser. No. 21,465, now Patent No. 3,099,288, dated July 30, 1963. Divided and this application Dec. 7, 1962, Ser. No. 243,045
5 Claims. (Cl. 137—525.7)

This is a division of my copending application Serial Number 21,465, filed April 11, 1960, now United States Letters Patent 3,099,288, issued July 30 1963, and assigned to the same assignee as this invention.

This invention relates to fluid control apparatus and particularly to improved nonclogging check valve structure for utilization in fluid transfer equipment.

The present check valve structure has utility in various types of fluid conveying apparatus and particularly equipment for transferring fluids having solid particles therein. Since sewage normally contains solid materials suspended in the liquid phase, the check valve is especially useful when disposed in a conduit for conveying sewage or similar materials from a tank or basin to another treatment unit or disposal area. It is desirable that the sewage including all solid particles pass freely through the valve, yet it is necessary that the valve structure close properly to preclude passage of any liquid through the conduit when flow of fluid ceases or a vacuum is placed on the tank or basin from which the sewage is directed and to which the conduit having the present check valve structure therein is connected.

The primary object of the present invention is to provide check valve structure for fluid transfer equipment which will not become clogged during flow of fluid therethrough, and yet will close without leakage of air or liquid therethrough upon cessation of flow of fluid or upon imposition of a vacuum on the apparatus, tank or other equipment for receiving the fluid and to which the conduit containing the check valve is coupled.

A further important object of the invention is to provide check valve structure of the characteristics described above which is extremely simple in construction, may be manufactured at a minimum cost and which may be repaired when necessary by the simple expedient of replacing the flexible diaphragm or valve components constituting a part of the valve.

A still further aim of the invention is to provide a check valve which will close to preclude further passage of fluid therethrough, notwithstanding the fact that solid particles or materials may be deposited on the exposed surfaces of the flexible elements positioned to close an aperture in the valve.

Other significant objects of the invention include the provision of a nonclogging check valve for use in fluid transfer equipment wherein the valve constitutes a tubular, flexible member having an opening therein permitting the fluid to flow into the tubular member and thence through the same during the time that the valve is open, and with the resilient member being mounted on a suitable support therefor in a manner to cause the same to collapse and thereby preclude passage of fluid through the same when suction is applied to the structure to which the line having the check valve therein is attached, or when flow of liquid materials ceases, whereby the defined valve closes quickly and completely even though solid particles may be left in the interior of the tubular member prior to collapsing thereof; to the provision of check valve structure as described above which is adapted to be mounted on the upright segment of a fluid conduit for discharge of fluid upwardly through an opening in the valve body, and wherein is included weight means on the flexible, movable portion of the valve element to gravitationally bias the flexible portion of the valve element into the normal closing position thereof; to another type of check valve structure comprising a pair of rectangular, flexible valve elements interconnected along three edges thereof and placed over the valve body in a manner to permit the free margins of the flexible elements to part under pressure of fluid flowing through the supply conduit; to valve structure as set forth hereinabove including a pair of flexible valve elements of rectangular configuration and interconnected along three marginal edges thereof, wherein closing of the valve is effected immediately upon cessation of flow of the fluid by virtue of collapsing of the valve elements into relatively flat condition in closing relationship to the opening in the valve; to the provision of check valve structure having a flexible member normally disposed in closing relationship to an opening in the valve body and having inflexible means on the movable member, shiftable therewith and of a size to prevent cupping of the flexible member into the valve body opening when a negative pressure is applied to the fluid conduit having the check valve disposed therein; and to other important objects and details of construction of the present check valve structure which will become obvious or be explained in greater detail as the following specification progresses.

The check valve structure disclosed herein, although having greatest utility in the sewage treatment field, may also be used to advantage in other fluid transfer equipment wherein the fluid may have solid particles therein. For example, the check valve may be employed in apparatus for pumping fish from one storage area to another or to processing equipment, in apparatus for transferring sugar beets while in water, and other similar uses.

Figure 1:
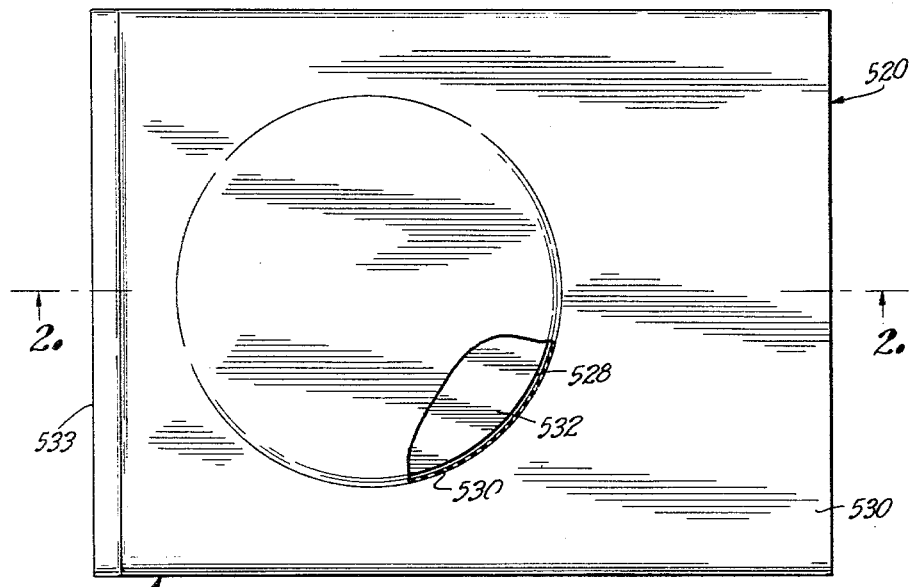
FIG. 1 is a plan view of check valve structure having the features of the present invention incorporated therein, with a portion of the flexible element of the valve being broken away and in section to show the construction of the valve.
Figure 2:
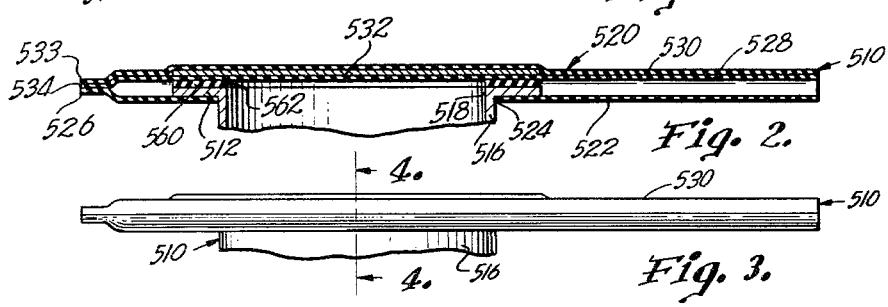
FIG. 2 is a vertical cross-sectional view taken on the line 2—2 of FIG. 1.
Figure 3:
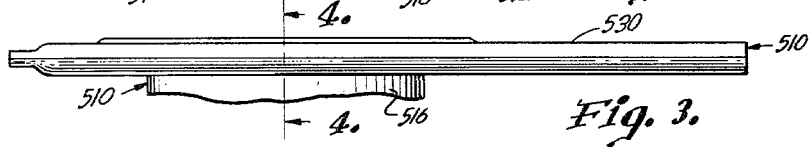
FIG. 3 is a fragmentary, side elevational view of the valve as illustrated in FIGS. 1 and 2.
Figure 4:
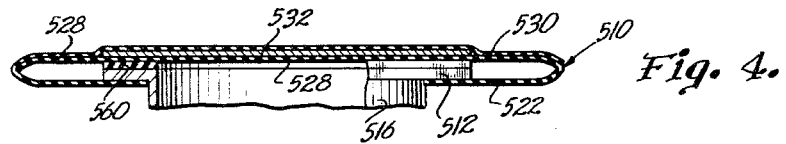
FIG. 4 is a vertical cross-sectional view taken on the line 4—4 of FIG. 3.

Nonclogging check valve structure 510 is adapted to be positioned in a receptacle and includes a cylindrical coupling 516 adapted to be connected to an upright section of a sewage supply line leading from another tank or basin which may include a conduit for discharge of sewage through flexible valve structure 520 mounted on member 512 secured to the upper end of coupling 516. Member 512 is of polygonal configuration and preferably square, as shown in FIGS. 2 and 4, and is provided with a centrally disposed opening 518 therein equal to the diameter of coupling 516 and coaxial with the latter. A square rubber gasket 560 is adhesively secured to the upper surface of member 512, has a peripheral margin complemental with the edge of member 512, and is provided with a central orifice 562 therein registering with opening 518.

Flexible valve structure 520 includes a generally rectangular component 522 of greater width than member 512 and of substantially greater length than the latter. Component 522 has an opening 524 therein in closer proximity to margin 526 of component 522 than opposed margin 528 thereof, with opening 524 being of a size to clear coupling 516 and with the peripheral margin of component 522 defining opening 524 being in engagement with the outer surface of coupling 516 when structure 520 is mounted on member 512 and coupling 516.

Although component 522 may be a separate piece of sheet rubber or the like, it is to be preferred that the same constitute one portion of a relatively large sheet, with component 522 constituting the central area thereof while opposed outer portions 528 and 530 are folded over one another, as shown in FIG. 4. During overlapping of portions 528 and 530, a spanner assembly such as metal disc 532 is placed between portions 528 and 530 in a position to be disposed in direct opposition to opening 518 upon closing of the valve, as will be hereinafter described. Those areas of portions 528 and 530 in abutting relationship are interconnected through adhesive means or by vulcanization procedure, as is well known in the art.

It is also contemplated that the margins 533 and 534 of portions 528 and 530 be interconnected by an adhesive or through vulcanization, as shown in FIG. 2. Thus, it can be seen that the valve structure presented by central component portion 522 and outer portions 528 and 530 are interconnected along three sides of the rectangular unit, with the other side of the valve structure 520 remaining open to permit sewage to flow outwardly therethrough.

Figure 5:
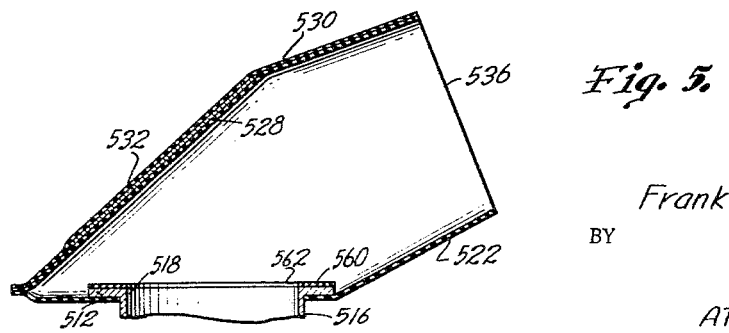
FIG. 5 is a fragmentary, vertical cross-sectional view of the valve shown in FIGS. 1 to 4, and illustrating the disposition of the flexible element of the valve when the same is in an open condition.

During operation of check valve structure 510, flow of sewage through the supply conduit and against the surface of the flexible valve element defined by portion 528 of the rubber sheet, causes portions 528 and 530 to move upwardly as shown in FIG. 5 to a position clearing the liquid sewage for discharge through the outlet 536 of structure 520. If square member 512 is approximately four inches across, then portions 528 and 530 should be approximately six inches thereacross to permit structure 520 to expand into generally tubular configuration, as illustrated in FIG. 5, of sufficient size to clear particles of a diameter equal to that of the coupling 516.

Upon cessation of flow of the sewage, metal disc 532 gravitationally biases portions 528 and 530 downwardly until the inner surface of portion 528 closes opening 562, as shown in FIG. 2. The size of metal disc 532 is important because this precludes the upper valve element presented by portions 528 and 530 from dishing down into component 516 under a negative pressure in the sewage supply conduit. It should also be pointed out that the relatively long flat ends of component 522 and the valve element presented by portions 528 and 530 assure sealing of the valve, notwithstanding disposition of solid particles on the internal surfaces of structure 520 upon closing thereof.

Structure 520 may readily be mounted on member 512 by grasping component 522 and expanding opening 524 therein sufficiently to clear member 512. The margins of component 522 defining opening 524 are then pushed upwardly into firm engagement with the underface of member 512. The construction described facilitates replacement of structure 520 or removal for cleaning purposes.

It is also to be pointed out that check valve structure 510 is adapted for utilization in an inverted position opposite to that shown, if desired, with negative pressure in the conduit effecting closing of the valve. Metal disc 532 operates to prevent the flexible valve element presented by portions 528 and 530 from collapsing into opening 562 and thereby dishing into the same a substantial distance.

Having thus described the invention what is claimed as new and desired to be secured by Letters Patent is:

1. The combination of a sewage disposal line, a check valve having an outlet in said disposal line and an inlet connected to a source of sewage including a conduit through which flow relatively large solid bodies in a liquid stream, said conduit frequently being subjected to negative pressure in a direction reverse to the flow of said stream, said check valve passing said bodies in the direction of liquid flow yet preventing reverse liquid flow under negative pressure by sealing around any bodies temporarily deposited thereon and comprising: a substantially flat rigid member provided with an opening therein, coupling means extending from one surface of said member and communicating with said opening and connecting same to said sewage conduit, a valve element comprising a flattened highly flexible resilient tube having a sealed end and an open end, there being a hole through one side of said tube receiving said coupling means for securing the valve element to said member on opposite sides of said opening in normal full closing relationship thereto, said tube being capable of flexing transversely thereof under pressure of liquid in said conduit into an expanded configuration permitting bodies having a dimension substantially as large as the diameter of said opening to pass through the opening and out through said open end, spanner means on said tube in direct opposition to said opening for preventing the element from cupping into said opening from the opposite surface of said member when a negative pressure is applied to said conduit, and opposed portions of said tube extending beyond said member a distance sufficient to assure sealing of said valve notwithstanding deposition on the valve internal surfaces of relatively large bodies that have passed through said opening.

2. The combination of a sewage disposal line, a check valve having an outlet in said disposal line and an inlet connected to a source of sewage including a conduit through which flow relatively large solid bodies in a liquid stream, said conduit frequently being subjected to negative pressure in a direction reverse to the flow of said stream, said check valve passing said bodies in the direction of liquid flow yet preventing reverse liquid flow under negative pressure by sealing around any bodies temporarily deposited thereon and comprising: a rigid member provided with an opening therein, coupling means extending from one surface of said member and communicating with said opening and connecting same to said sewage conduit, a resilient highly flexible valve element having a hole therethrough receiving said coupling means, said element having a closed end and an open end and encompassing said member so as to close said opening when in contact with the opposite surface of said member, said element being capable of flexing transversely under pressure of liquid in said conduit into an expanded configuration permitting bodies having a dimension substantially as large as the diameter of said opening to pass through the opening and between the element and said member, spanner means on said element in direct opposition to said opening for preventing the element from cupping into said opening when a negative pressure is applied to said conduit, and said element having opposed portions extending beyond said member a distance sufficient to assure sealing of said valve notwithstanding deposition on the valve internal surfaces of relatively large bodies that have passed through said opening.

3. The combination of a sewage disposal line, a check valve having an outlet in said disposal line and an inlet connected to a source of sewage including a conduit through which flow relatively large solid bodies in a liquid stream, said conduit frequently being subjected to negative pressure in a direction reverse to the flow of said stream, said check valve passing said bodies in the direction of liquid flow yet preventing reverse liquid flow under negative pressure by sealing around any body temporarily deposited thereon and comprising: a relatively rigid member provided with an opening therein, coupling means on said member communicating with said opening and connecting same to said sewage conduit, a resilient highly flexible valve element having an open end and a closed end, means securing the element to said member on opposite sides of said opening in normal full closing relationship thereto, said element being capable of flexing transversely thereof under pressure of liquid in said conduit, into an expanded configuration permitting bodies having a dimension substantially as large as the diameter of said opening to pass through the opening and between the element and said member, spanner means comprising rigid plate means sandwiched between overlapping layers comprising a portion of said element in direct opposition to said opening for preventing the element from cupping into said opening when a negative pressure is applied to said conduit, said element having opposed portions extending beyond said member a distance sufficient to assure sealing of said valve notwithstanding deposition on the valve internal surfaces of relatively large bodies that have passed through said opening.

4. The combination of a sewage disposal line, a check valve having an outlet in said disposal line and an inlet connected to a source of sewage including a conduit through which flow relatively large solid bodies in a liquid stream, said conduit frequently being subjected to negative pressure in a direction reverse to the flow of said stream, said check valve passing said bodies in the direction of liquid flow yet preventing reverse liquid flow under negative pressure by sealingly closing around any bodies temporarily deposited thereon and comprising: a substantially flat rigid member provided with an opening therein, coupling means on said member communicating with said opening and connecting same to said sewage conduit, a resilient highly flexible valve element comprising a tube having a closed end and an open end, said member being encompassed by said tube and said coupling means extending through a hole in the side of said tube, said tube being capable of flexing transversely thereof under pressure of liquid in said conduit into an expanded configuration permitting bodies having a dimension substantially as large as the diameter of said opening to pass said element and said member and then through said open end, opposed portions of said tube adjacent said open end extending beyond said member a distance sufficient to assure sealing of said valve notwithstanding deposition on the valve internal surfaces of relatively large bodies that have passed through said opening and spanner means on said element in direct opposition to said opening for preventing the element from cupping into said opening when a negative pressure is applied to said conduit.

5. The combination of a sewage disposal line, a check valve having an outlet in said disposal line and an inlet connected to a source of sewage including a conduit through which flow relatively large solid bodies in a liquid stream, said conduit frequently being subjected to negative pressure in a direction reverse to the flow of said stream, said check valve passing said bodies in the direction of liquid flow yet preventing reverse liquid flow under negative pressure by sealing around any bodies temporarily deposited thereon and comprising: a substantially flat rigid member provided with an opening therein, coupling means extending from one surface of said member and communicating with said opening and connecting same to said sewage conduit, a valve element comprising a generally rectangular, flattened, highly flexible, resilient tube having an open end and a closed end, there being a hole through one side thereof receiving said coupling means for securing the valve element to said member on opposite sides of said opening in normal full closing relationship thereto, said tube being capable of flexing transversely thereof under pressure of liquid in said conduit into an expanded configuration permitting bodies having a dimension substantially as large as the diameter of said opening to pass therethrough, spanner means comprising rigid plate means sandwiched between overlapping layers of material comprising said tube in direct opposition to said opening for preventing the element from cupping into said opening from the opposite surface of said member when a negative pressure is applied to said conduit, and opposed portions of said tube extending beyond said member a distance sufficient to assure sealing of said valve notwithstanding deposition on the valve internal surfaces of relatively large bodies that have passed through said opening.

References Cited by the Examiner
UNITED STATES PATENTS

| | | | |
|---|---|---|---|
| 141,587 | 8/1873 | Painter | 137—525.1 |
| 187,411 | 2/1877 | Painter | 137—525.1 |
| 298,208 | 5/1884 | Irving | 137—525.1 |
| 1,419,829 | 6/1922 | Dowd | 222—491 |
| 1,956,691 | 5/1934 | McCune | 137—525.3 X |
| 1,969,118 | 8/1934 | Brucker | 137—525.1 X |
| 2,301,479 | 11/1942 | Tousley | 137—525.3 X |
| 2,494,653 | 1/1950 | Geffroy | 137—525.1 |
| 2,623,726 | 12/1952 | Suska | 251—364 |

ISADOR WEIL, *Primary Examiner.*

WILLIAM F. O'DEA, *Examiner.*